Oct. 3, 1950     R. DESCENDRE     2,524,342
AUTOMATIC CHANGE SPEED DEVICE
Filed March 14, 1940     5 Sheets-Sheet 1

Inventor,
R. Descendre
By: Glascock Downing & Seebold
Attys.

Oct. 3, 1950 R. DESCENDRE 2,524,342
AUTOMATIC CHANGE SPEED DEVICE
Filed March 14, 1940 5 Sheets-Sheet 2

Inventor,
R. Descendre

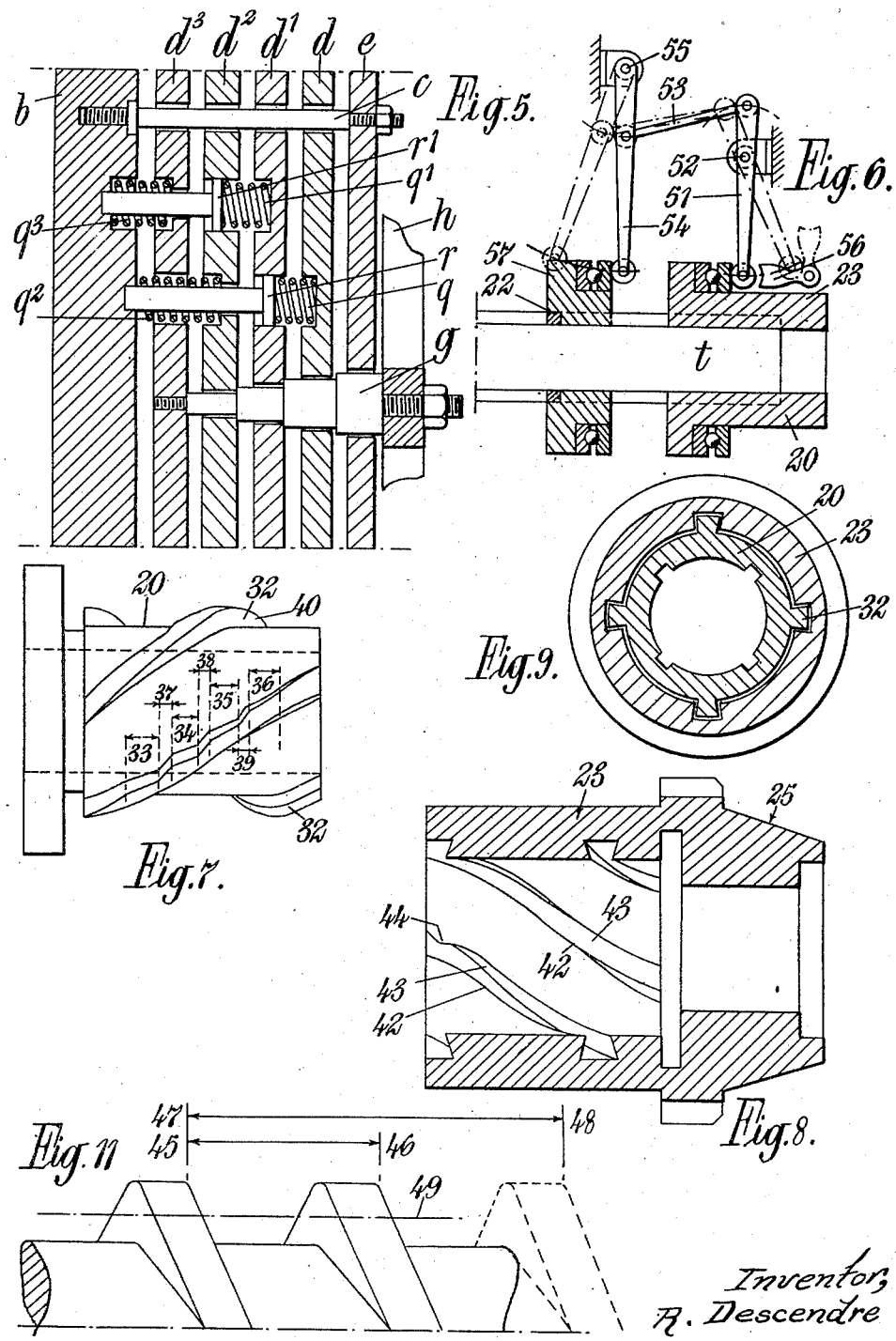

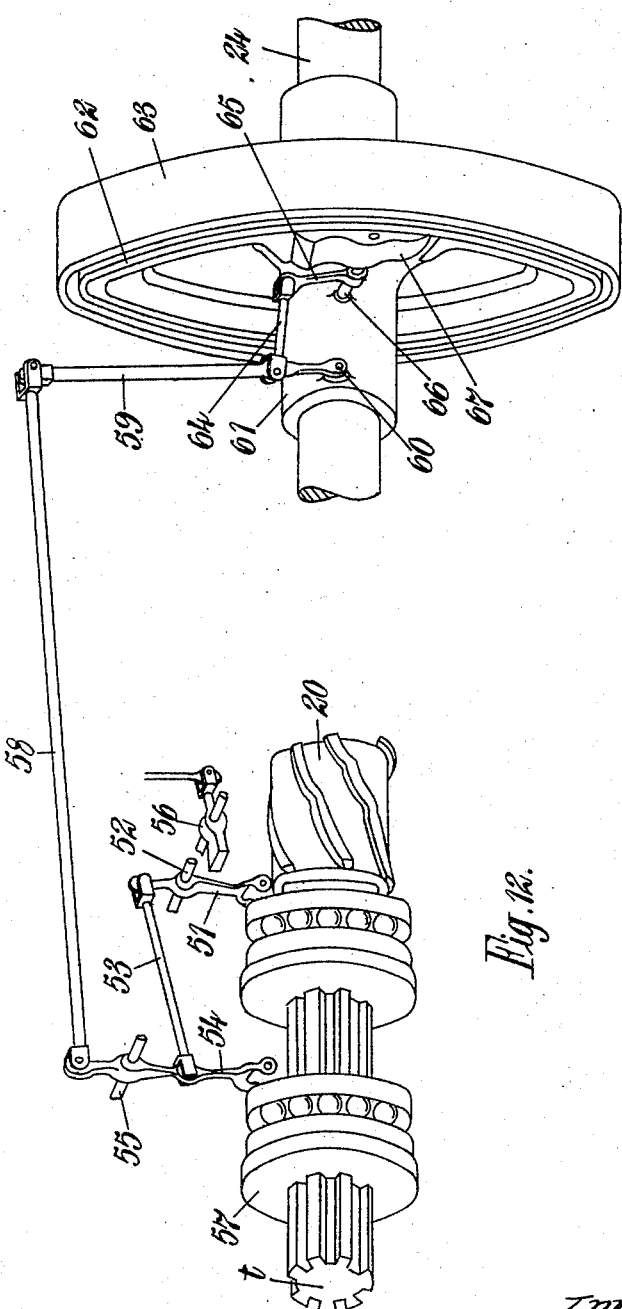

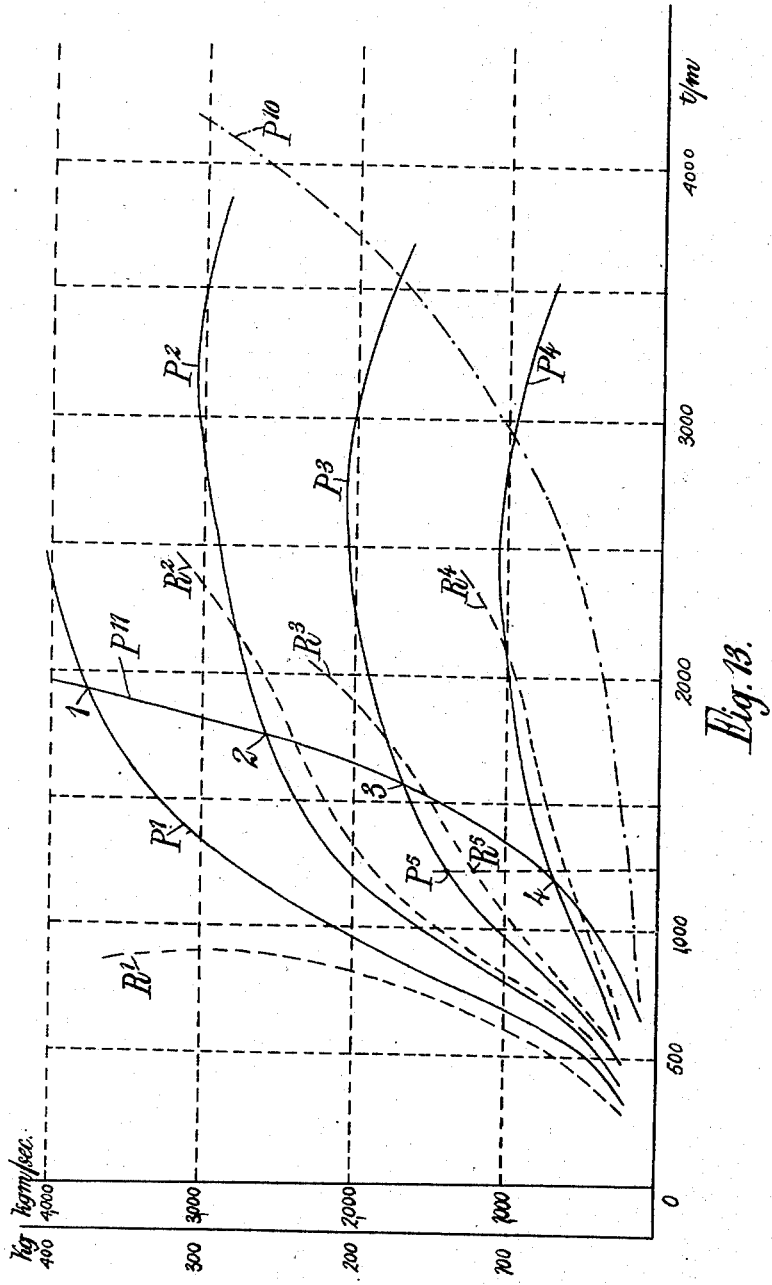

Patented Oct. 3, 1950

2,524,342

UNITED STATES PATENT OFFICE 2,524,342

AUTOMATIC CHANGE SPEED DEVICE

Robert Descendre, Paris, France, assignor to Societe Francois Conte, Paris, France, a joint-stock company of France Application March 14, 1940, Serial No. 323,970
In France March 29, 1939

Section 3, Public Law 690, August 8, 1946
Patent expires March 29, 1959

10 Claims. (Cl. 74—336)

This invention relates to automatic change speed mechanism which may be used for example in driving self-propelled vehicles.

The invention will be hereinafter described as applied to this purpose but it is to be understood that it is not limited to the driving of vehicles, since it may be used for many other purposes where a change speed gear is required.

The automatic control device which is the object of the present invention makes use of:

1. The antagonistic actions of the resistant torque and the motor torque which are caused to mutually act directly on a nut-screw transmission which operatively connects the motor shaft and the driven shaft.

2. The action of the motor on a special type of centrifugal regulator.

The arrangement is such that there are two forces acting in the transmission system which comprise (a) the resultant of the motor torque and the resistant torque acting upon the nut screw transmission and (b) the force due to the action of the regulator. The motion of the regulator and the nut screw transmission are used for the control of a set of gear ratios.

Before discussing the mechanical principles underlying the invention it will be convenient to describe in detail one embodiment of the invention as applied, by way of example, to the propulsion of a motor car.

Reference will now be made to the accompanying drawings in which:

Figure 5 is a sectional detail view of a part of the clutch mechanism.

Figure 6 is a detail hereinafter referred to.

Figure 7 is a side view of the screw portion of the screw-nut device.

Figure 8 is a longitudinal section of the nut portion of the same device.

Figure 9 is a cross-section of the screw-nut device.

Figure 11 is an explanatory diagram of a screw thread.

Figure 12 is a diagrammatic view relating to a brake mechanism, and

Figure 13 is a diagram showing various force curves as hereinafter explained.

Figure 1:
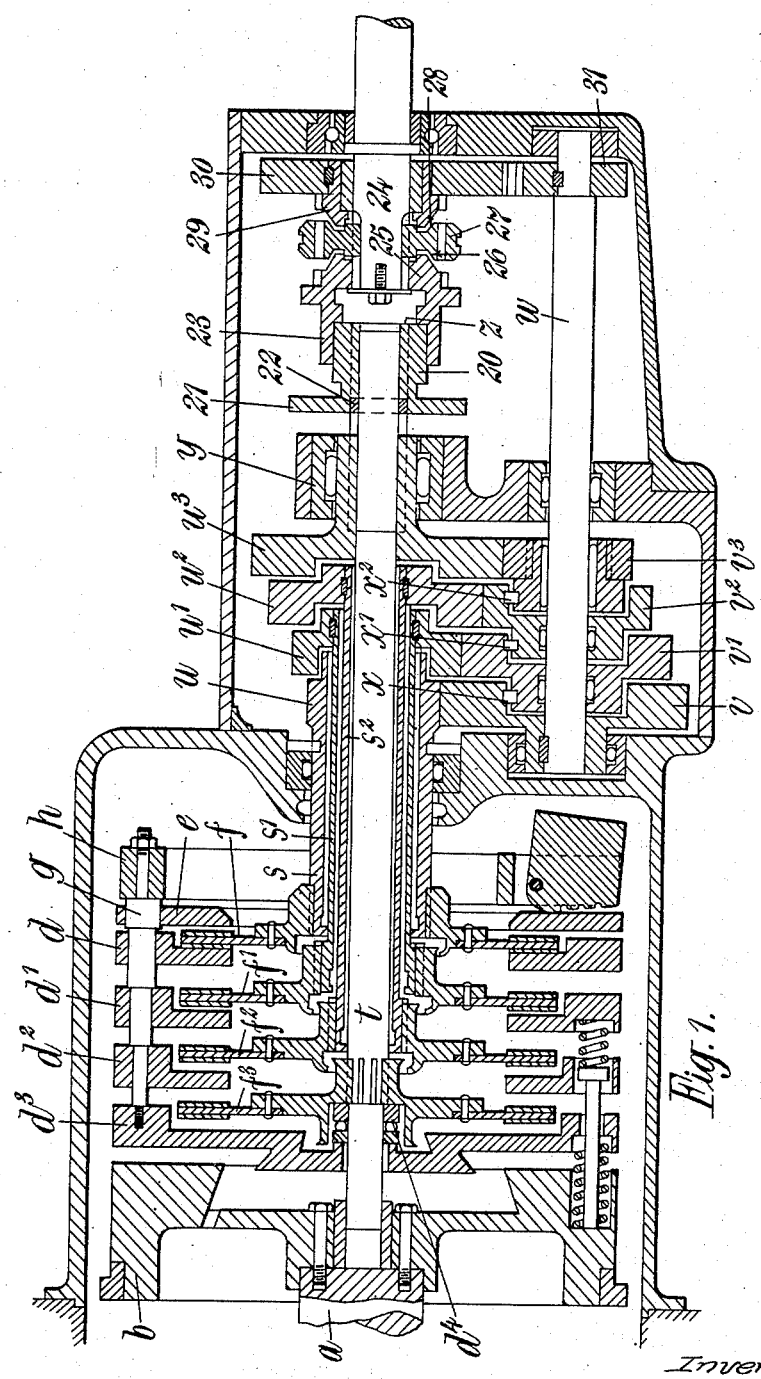
Figure 1 is a longitudinal section of a gearing constructed in accordance with the invention.
Figures 2, 3:
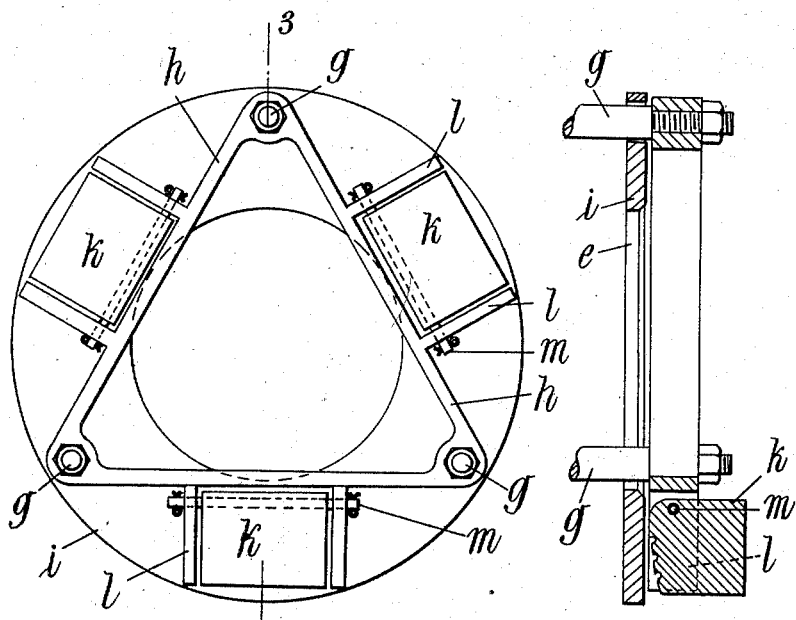
Figure 2 is an end elevation of the centrifugal regulator.
Figure 3 is a transverse section taken on the line 3—3 of Figure 2.
Figure 4:
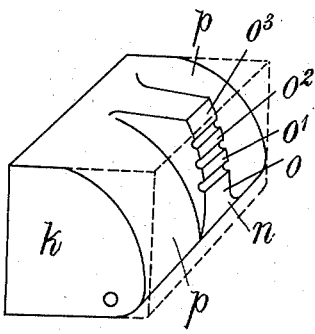
Figure 4 is a perspective view of one of the weights of the regulator detached.

Referring more particularly to Figure 1, the input shaft $a$ carries a fly wheel $b$, and carried by such fly wheel, through a number of bolts $c$, Figure 5, is a series of clutch plates $d, d^1, d^2, d^3$, and the other ends of the bolts $c$ are threaded into a fixed ring or plate $e$. Corresponding to such plates is a series of clutch discs $f, f^1, f^2, f^3$ mounted as hereinafter described. To control the engagement and disengagement of each pair of plates and discs, three bolts $g$, only one of which is shown in Figures 1 and 5, are secured at their inner ends to the clutch plate $d^3$, and are progressively stepped to pass freely through the other clutch plates $d^2, d^1, d$, and are finally secured to a spider plate $h$ upon which centrifugal weights $k$ are carried. Preferably the spider plate $h$ is of the triangular form shown in Figure 2, and each of the three sides carries a pair of side plates $l$, the associated weight $k$ being mounted on a bolt $m$ carried by the side plates $l$. Such a symmetrical arrangement of the weights $k$ and the spider plate $h$ forms a centrifugal regulator rotated from the fly wheel $b$ which is designed to control, or be influenced by, the clutch plates $d, d^1, d^2, d^3$. For this purpose the weights $k$ are of the special form shown in Figure 4. The pivot $m$ upon which they are each carried is near one corner of the cross section of the weight adjacent the fixed plate $e$ and the face $n$ of the weight near the plate $e$ and approximately central in the length of the weight is adapted as the speed of rotation increases to press harder and harder upon the plate $e$ as the weights fly outwards. As the plate $e$ cannot move sidewise, the spider plate $e$ with its bolts $g$ will move endwise and tighten the clutch plates $d, d^1, d^2, d^3$ one after the other. This is done successively as the face $n$ of the weights is divided up into a number of cam faces $o, o^1, o^2, o^3$ so as to correspond with the clutch plates, each cam face corresponding to a particular speed. As shown in Figure 4 the face $n$ on each weight projects outward from the weight, the parts of the weight on each side being faired away as at $p$. It will be seen that the cam faces $o, o^1, o^2, o^3$ are separated by grooves which produce a sudden variation of the force at the point where the speed is changed, so as to avoid the building up of any oscillation.

By reference to Figure 5 it will be seen that the clutch plates are under spring pressure which normally will tend to bring them into engagement with the corresponding clutch discs $f, f^1, f^2, f^3$ were it not for the enlargement steps on the bolts $g$. Thus the clutch plate $d$ is under the influence of the spring $q$, which abuts at one end against the plate and at the other end against a stop $r$; the clutch plate $d$ has a spring $q^1$ which in a similar manner presses at one end on the plate and at the other end against a stop $r^1$; the plate $d^2$ is acted upon in a similar way by a spring $q^2$, reacting against the flywheel $b$, and the plate $d^3$ in a similar way is provided with a spring $q^3$. In Figure 1 the clutch plate $d$ is shown in engagement with its clutch disc $f$ which constitutes the first speed.

The clutch discs $f$, $f^1$, $f^2$ are each mounted on one end respectively of the tubular shafts, $s$, $s^1$, $s^2$ each concentric with a centre shaft $t$, upon which latter is mounted the clutch disc $f^3$. The tubular shaft $s$ at its other end carries a toothed pinion $u$ in gear with a spur wheel $v$; the tubular shaft $s^1$ carries a toothed pinion $u^1$ in gear with a spur wheel $v^1$; the tubular shaft $s^2$ has a similar pinion $u^2$ gearing with $v^2$, and upon the centre shaft $t$ is splined a spur wheel $u^3$ in engagement with a pinion $v^3$. Each tubular sleeve $u$, $u^1$, $u^2$ is loosely mounted and concentric with the centre shaft and the pinions $v$, $v^1$, $v^2$, $v^3$, are arranged on a lay shaft $w$. The first pinion $v$ is keyed on the shaft $w$, and is adapted to transmit its drive to $v^1$ through a free wheel clutch $x$; $v^1$ in its turn transmits the drive to $v^2$ through a free wheel $x^1$, and $v^2$ drives $v^3$ through a free wheel clutch $x^2$. Thus each pinion ultimately drives the spur wheel $u^3$ on the shaft $t$. These pinions and spur wheels are in constant mesh and by means of the free wheel clutches, the pinions $v$, $v^1$, $v^2$ are successively freed when their relative angular velocity exceeds a predetermined value.

Such a gear train gives four speeds by the following combinations:

First speed: $d, s, u, v$ to $v^3, u^3, t$.
Second speed: $d^1, s^1, u^1, v^1$ to $v^3, u^3, t$.
Third speed: $d^2, s^2, u^2, v^2, v^3, u^3, t$.
Fourth speed: $d^3, t$.

The motor shaft $a$ as hereinbefore stated, transmits the drive to the output shaft $24$ by means of the screw nut device $20$, $23$. The screw $20$, the thrust of which is towards the left in Figure 1, moves the shaft $t$ in the same direction by means of the ring $22$. This thrust is transmitted to the clutch plate $d^3$ by the stop member $d^4$, and the clutch plate being connected to the centrifugal regulator by the rods $g$, the movement of the shaft $t$ towards the left under the thrust of the screw is thus opposed by the force of the weights $k$ of the regulator. The movement towards the left of the rods $g$ thus causes in succession the disengagement of the clutch plates $d^2$, $d^1$, $d$ and throwing out the corresponding speeds. When the force of the regulator exceeds the opposing action the weights $k$ thrust the regulator outward from the fixed plate $e$, which draws the rods $g$ to the right thus successively releasing the clutch plates and clutching-in the different speeds.

One end of shaft $t$ is supported by being telescoped a short distance into the input shaft $a$, and upon its other end, which runs in a bearing $y$, is splined at $z$ a helical screw $20$. The front end of such screw is flanged at $21$, the flange being socketed to receive a ring $22$ fast with the shaft to take the thrust of the screw $20$, and $23$ is a threaded nut engaging the screw, which nut is loosely mounted upon the output shaft $24$. To impart the drive to the output shaft, the end of the nut $23$ is coned as at $25$ and a similarly coned surface $26$ is provided upon a sliding clutch member $27$ which is splined on the output shaft and in this way a synchro-mesh effect may be obtained. A reverse drive is afforded by forming the other side of the clutch with a second coned surface $28$ to engage a similar cone $29$ on a spur wheel $30$ loosely mounted on the output shaft $24$.

The spur wheel $30$ is in engagement with a pinion $31$ on the end of the layshaft $w$ driven by the spur wheel $v$. By moving the clutch member $27$ so as to engage either the cone surface $25$ or $29$, so the output shaft will be driven ahead or in reverse as the case may be.

It will be understood that the gears $u, u^1, u^2, u^3$ and $v, v^1, v^2, v^3$ are of the appropriate different diameters to provide gear ratios and changes of speed desired.

From the foregoing description it will be understood that the transmission of the various speeds to the output shaft takes place through the medium of the nut screw device $20$, $23$. The screw threading is of quick pitch and may be constant or variable and its action is correlated with a centrifugal regulator so that the resistant torque offered by the output shaft and the motor torque are interrelated to select or bring into action any one of the speed ratios provided in the apparatus and this will be fully discussed hereafter.

Figure 10:
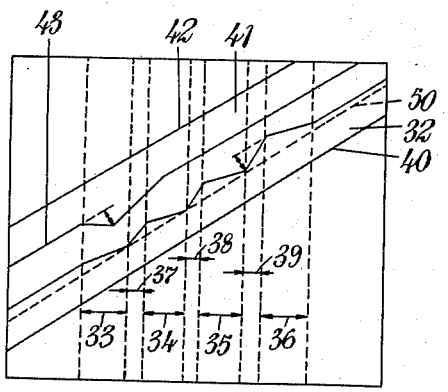
Figure 10 is a developed view of a thread on the nut and on the screw respectively.

In the present example being described a screw nut transmission of variable pitch is preferred and this is illustrated in Figures 7 to 11. The screw is denoted generally by $20$ as before described and is shown detached in Figure 7. The thread $32$ is preferably of trapezoidal cross section as shown in Figure 9 and one flank of each thread is of variable pitch in stages indicated at $33, 34, 35, 36$, each stage being separated by a transition step or interval shown at $37, 38$, and $39$, whilst the other flank at $40$ is of the usual constant pitch. The nut $23$ is grooved at $41$, in which one side $42$ of the groove is of constant pitch to correspond with that of the flank $40$ of the screw threading, whilst the other side $43$ is provided with a cam $44$, so that during the relative longitudinal rotational movements of the nut and the screw, the cam will assist the adjustment into one of the various stages $33, 34, 35, 36$ and temporarily retain the parts in such position. Figure 10 shows a developed view of this special threading in which $32$ represents one thread of the screw $20$ and $41$ shows a single thread of the nut. Sufficient play would be allowed between the various threads to allow for the movement of the cam $44$ in riding over the variable surfaces $33, 34, 35$ and $36$ of the flanks. It will be understood that the flanks $40$ and $42$ of constant pitch will engage similar flanks of constant pitch on the threads next adjacent. The threading may be of any desired pitch length but will usually be somewhat quick, and may be either single or multiple. In the diagram, Figure 11, if a single thread is used, the pitch as usual will extend from $45$ to $46$, whereas if a double thread is used, the pitch will extend from $47$ to $48$. Thus in a double thread, the distance $45$ to $46$ may be described as the apparent pitch, but the distance from $47$ to $48$ is the real pitch. The line $49$ shows the mean diameter of the screw and in Figure 10 the dotted line $50$ shows the mean pitch of the thread.

The general principles underlying an automatic change speed gear as above described, will now be discussed:

The centrifugal regulator with its weights $k$ has two characteristics:

(1) The force of the weights $k$ increases with an increase of speed in such a way that the curve representing this action as a function of the angular velocity of the shaft $t$, is not a parabola as in the ordinary centrifugal regulator, but is a curve having the same shape as the power-speed curve of the motor, i. e. a curve showing the power of the motor as a function of the number of revolutions per minute. This result is obtained by making the weights $k$ of the special shape hereinbefore described and shown in Figures 3 and 4.

(2) The weights of the regulator are adapted, as already described, to press upon the thrust plate member $e$ by means of the cam member $n$ which is subdivided into a number of separate cam faces $o$, $o^1$, $o^2$, $o^3$ in such a way that the regulator can exert different degrees of force, each of which corresponds to one speed of the gear box. The shape of these cams and of the weights is determined in such a way that the motion of the centre of gravity of the weight and the variation of the point where the thrust of the regulator is applied, produce a variation of the said thrust corresponding to the series of R curves to be produced.

The regulator therefore has several zones of action, and in each of these zones the force curve of the regulator as a function of the angular velocity of the shaft, has the same shape as the corresponding power speed curve of the motor. It is known that any given motor has several power-speed curves, one for each speed of the gear box used, this being due to variation in the efficiency of the transmission from stage to stage of the various change speed gears and Figure 13 shows a set of such curves, which correspond with those of a four-speed gear box. The power speed curves are indicated by $P^1$, $P^2$, $P^3$, $P^4$ and the force curves of the centrifugal regulator are denoted by $R^1$, $R^2$, $R^3$, $R^4$. In this diagram, the horizontal scale shows revolutions per minute of the input shaft $a$. Two vertical scales are used, one scale showing kilogramme metres per second and indicating the power of the motor, and the other scale indicating in kilogrammes the force of the regulator, i. e. 10 kilogramme metres per second on one scale = 1 kilogramme on the other. The ratio between the two scales is P/R, in which P is the power of the motor at the lowest speed used in practice (500 revolutions per minute for example) and R the force of the regulator at this speed. The four curves $P^1$, $P^2$, $P^3$, $P^4$ are the power speed curves for the four speeds of the gear box. The curves $R^1$, $R^2$, $R^3$, $R^4$ indicate the force of the regulator added to which is the force of the various springs $q$, $q^1$, $q^2$, $q^3$ for the different clutch plates used for the corresponding speeds of the gear box. Thus if F is the force of the springs for one of the clutch plates (all the clutches being identical) the curve $R^4$ will show the action of the regulator for direct drive; the curve $R^3+F$, the action of the regulator for the third speed; the curve $R^2+2F$ the action of the regulator for the second speed, and the curve $R^1+3F$ the action of the regulator for the first speed. The curves $R^4$, $R^3$, $R^2$ follow the curves $P^4$, $P^3$, $P^2$ and the distance between the curves has been somewhat exaggerated for greater clearness and is actually about ½% of the value of P for any given point of a P curve. This means that for a given number of revolutions per minute of the shaft, the value P of the power output of the shaft, measured with a unit equal to ten kilogramme metre seconds and the value R of the distance from the curve R to the horizontal axis, are related by the equation $$R - O, 5\% \ P = P$$

In other words the distance between the two curves is always about one half per cent. of the value of P. In Figure 13 the distance $$P^5 R^5 = \frac{1}{2}\% \ P^6 P^5$$

and this is true for any point $P^5$ of a P curve.

Any R curve intersects the corresponding P curve at a point near its maximum, and above this point the centrifugal regulator is adjusted in such a way that the R curve assumes again the ordinary parabolic shape. The curve $R^1$ on the contrary does not follow the power speed curve $P^1$ of the first speed, but remains constantly above it. The purpose of this is to make the regulator for the first speed more powerful than that of the screw nut 20, 23, thus avoiding any slipping of the clutch corresponding to such first speed.

By reference to Figure 13 it will be seen that in addition to the curves $P^1$, $P^2$, $P^3$, $P^4$ and $R^1$, $R^2$, $R^3$, $R^4$ a curve $P^{10}$ is shown, and this indicates the power necessary to maintain the vehicle at a given speed on a level road against friction and air resistance. This curve may be obtained by means of a dynamometer mounted on the output shaft 24 and recording the resistant torque at varying speeds depending on the changing gradients of the road. Assuming however that the road be level, then for a given speed and until the point representing a power-speed condition on one of the curves $P^1$, $P^2$, $P^3$, $P^4$ has not yet reached the point of intersection of this curve with the corresponding R curve, a condition of equilibrium is reached between the action of the screw and that of the centrifugal regulator. When this point is reached, the regulator automatically causes a change to a greater speed. Before this point of intersection however is reached there are two possible changes that may occur:

1. Because of an increase in the resistant torque, due for example to the fact that the vehicle is ascending a gradient and the corresponding curve $P^{10}$ has been interested by one of the curves $P^1$, $P^2$, $P^3$, $P^4$ the motor arrives at its maximum of power for this set of conditions, then at this moment the action of the screw at once produces the change to a lower speed.

2. The resistant torque may decrease, in which case the centrifugal regulator will then automatically cause a change to a greater speed.

It will be clear that the regulator and the screw must be calculated for each type of car, and it is to be understood that the shape of the weights of the regulator and the variation in the pitch of the screw depend on:

(a) The motor to be used.
(b) The type of gear box, and
(c) The car on which the motor and the gear box are to be mounted.

The regulator is so designed that for any point of an R curve below the point at which this curve intersects the corresponding P curve the force R of the regulator is given by the equation $$R + F = D + 0.5\% \ (R + F)$$

D being the thrust of the screw for the same number of R. P. M. of the motor and the same stage of the various gear ratios. From this may be plotted the characteristics or form of the screw (Figure 7). If C is the torque to be transmitted by the screw, C is related to D by the formula:

$$C = D \ tg \ A$$

where A is the angle of the screw thread with its axis $tg$ A is in turn given by the formula:

$$cotg A = \frac{d}{\pi_p}$$

$d$ being the medium diameter of the screw and $p$ the apparent pitch of the screw. This formula is only exact when there is no relative motion between the parts of the screw nut device, or vice versa the real pitch of the screw must be introduced into the equation; the real pitch of the screw being smaller than the apparent pitch, the thrust of the screw is greater when there is relative motion between the screw and the nut, than when the nut is at rest relatively to the screw. The screw is designed in such a way that this difference of thrust is always equal to:

$$0.5\% \ (R+F)$$

Thus the screw nut transmission as well as the centrifugal regulator have to exert a greater force to break a condition of equilibrium than to maintain it. Therefore, if the screw has been moved by an increase in the resistant torque, the force to be exerted by the regulator to bring it back into its initial position is unequal to the increase in the resistant torque but slightly greater. Inversely, if an increase of the power of the motor causes a movement of the regulator and therefore a change in the condition of the regulator and screw nut system, the increase in the resistant torque necessary to produce the inverse shift is not equal to the increase of the motor torque which has caused the shift, but slightly greater. This prevents the building up of oscillation and the too frequent gear changes which have been, until now, the great defect of this type of gear box.

Another important advantage of an automatic change gear system according to the invention is obtained by making the pitch of the screw variable. The reason for this is as follows:

At the moment of the change over to a slower speed, the screw must not only oppose and overcome the force of the regulator, but it has also to overcome the resistance of the parts it actuates (and notably of the power of the springs of the clutch plates). It is therefore requisite that the thrust of the screw should increase as the speed diminishes, with an additional increase of the thrust in the parts of the screw corresponding to the changes in the speeds. To each speed there will correspond a part of the screw having a definite pitch, which pitch decreases with the speed. As already explained with reference to Figures 7 to 10, these changes in pitch 33 to 36 are connected by transition parts 37, 38, 39 corresponding to the changing of speeds.

By way of example only, the following figures are given for the screw in a four speed box, the diameter of the screw being 40 mm. and transmitting a torque of 12 H. P.

1st speed, has a pitch of 48.2 and the transition from 1st to 2nd speed has a pitch of 45.
2nd speed, has a pitch of 50 and the pitch transition from 2nd to 3rd is 46.
3rd speed, pitch 55.
4th speed, pitch 57.

The pitches referred to above are metrical, i. e., if a screw has a pitch of 100, the nut will advance one hundred millimetres for one complete rotation of the screw.

The pitch thus defined is called in France the "apparent" pitch and the pitch obtained when the threads are counted along the axis of the screw and not along the thread is called the "real" pitch. If $A$ is the angle of inclination of the thread to the axis of the screw, $p$ the apparent pitch and $p$ (real) is the real pitch, the following formula will hold if the screw has only one thread:

$$p \ (\text{real}) = p \cos A$$

If the screw has an $n$ number of threads (in practice screws having up to four threads are used), the formula will be:

$$p \ (\text{real}) = \frac{p \cos A}{n}$$

A may be derived from the formula $$tg \frac{A = p}{d\pi}$$

where $d$ is the medium diameter of the thread, i. e. the external diameter of the thread less twice the depth of the thread.

Normally the diameter of the thread will remain constant along its whole length, but a screw may be used having a constant pitch and a variable diameter. Also it is possible in some cases to use a screw having a constant pitch and a constant diameter but connected to the nut by a coupling comprising a cam of suitable shape.

As an addition to the automatic change speed gear described in the foregoing, a safety device shown in Figure 12 may be used, which makes it possible to automatically change to lower speeds when the car is on a down gradient driven by its own weight. Assuming that the car is in the fourth gear, i. e. direct drive, the screw $s$ continues to move towards the right and is caused to actuate a lever system comprising a lever 51 fulcrumed at 52 on a suitable fixed part of the gear box. Lever 51 is joined by a link 53 to a second lever 54 fulcrumed at 55. With the stop member 56 turned into the dotted position, the nut 20 as it continues to move to the right, swings the lever 51 into the dotted position and moves the lever 54 towards the left, the free end of which presses upon an additional flange member 57 which is adapted to longitudinally move the shaft $t$ to the left by acting upon the stop ring 22 in a manner similar to that previously described with reference to Figure 1 in order to bring the lower speeds into action. It will be understood that this safety device will be put out of action when the stop 56 is in the full line position shown.

In a modification such a safety device may be adapted to actuate a brake mechanism and this is illustrated in perspective view in Figure 12. The same general arrangement of levers 51, 54 is employed, but the lever 54 is extended beyond its fulcrum 55 with its free end connected to a transmission rod 58. The end of this rod is connected to a lever 59 fulcrumed at 60 upon a stationary sleeve 61 mounted loosely upon the output shaft 24. The sleeve 61 carries a disc or frame supporting a band brake 62, adapted to be expanded internally against a brake drum 63 keyed on the shaft 24. When the lever 59 is actuated a link 64 transmits the movement to a lever 65 which gives a rotational adjustment to a shaft 66 mounted at one end in sleeve 61 and actuating a cam 67 at its other end to expand the band brake in the well-known way and arrest the movement of the brake drum 63 to check the speed of the output shaft.

It may be stated that automatic change speed gears in general use and involving the use of a centrifugal regulator have only one regulator curve for all of the power speed curves of the different gear ratios. Such a power diagram is shown by the curve $P^{11}$ of Figure 13. This curve intersects the power speed curves $P^1$, $P^2$, $P^3$, $P^4$ at the points 1, 2, 3, 4. It is clear that these points of intersection are well below the maxima of these curves. As the changes of speed occur at these points, it will be seen that the top power of the motor is never used. The efficiency is therefore low i. e. the car therefore consumes more fuel than a car fitted with an ordinary gear box under the control of the driver.

It is therefore an important characteristic of a gear box according to the invention, that the power of the motor is used in such a way that the change over to another speed occurs only when the motor has almost reached its maximum power for a given gear ratio. In this way therefore the consumption of fuel is not increased by the use of the gear box. It may be pointed out that some waste of fuel is inevitable with ordinary gear boxes in general use because the driver frequently changes speed too early or too late. Tests however of the new gear box according to the invention have shown that an actual economy of fuel is effected.

I claim:

1. Automatic change-speed mechanism for transmitting motion to a driven shaft from a driving shaft actuated by a motor the power of which varies with its speed of revolution, comprising: a number of transmission elements, each corresponding to a different gear ratio, in parallel between the driving and driven shafts, a centrifugal regulator driven by the driving shaft, a torque-responsive member consisting of a nut-and-screw device, a thrust abutment against which the weights of the centrifugal regulator bear, a cam interposed between the said weights and the thrust abutment, the cam being formed with a succession of faces of different inclinations which are brought into contact with the thrust abutment successively by the centrifugal weights as the speed of the driving shaft changes, thus varying the force of the thrust, and means controlled by the varying thrust for bringing the different transmission elements into operation.

2. Automatic change-speed mechanism as claimed in claim 1, the cam being formed with grooves separating the successive faces.

3. Automatic change-speed mechanism as claimed in claim 1, the transmission elements including spring-pressed clutch discs, each corresponding to a different gear ratio, the cams of the centrifugal regulator weights being adapted to act on the successive clutch discs progressively.

4. Automatic change-speed mechanism as claimed in claim 1, the torque-responsive nut-and-screw device including a screw of variable pitch.

5. Automatic change-speed mechanism as claimed in claim 1, the torque-responsive nut-and-screw device including a screw of variable pitch, the thread of which is divided into stages, each stage corresponding to one of a number of gear ratios, the pitch of the screw being constant for each stage, the pitches of successive stages being progressively greater, that stage that corresponds with direct drive having the greatest pitch, and the thread being formed with transition zones corresponding to the speed changes between the successive stages.

6. Automatic change-speed mechanism for transmitting motion to a driven shaft from a driving shaft actuated by a motor the power of which varies with its speed of revolution, comprising: a number of spring-pressed clutch discs, each corresponding to a different gear ratio, a thrust member for changing the gear by bringing the clutch discs successively into operation against the resistance of their springs, a centrifugal regulator driven by the driving shaft, the weights of the centrifugal regulator being adapted to actuate the thrust member, and a cam interposed between the said weights and the thrust member, the cam being formed with a succession of faces of different inclinations adapted to cause successive changes of gear ratio with progressive changes in the speed of the driving shaft, a central shaft capable of acting upon the clutch discs against the power of the regulator weights and in the same direction as the clutch-disc springs, a torque-responsive member consisting of a nut-and-screw device, the torque-responsive nut-and-screw device including a screw of variable pitch, the thread of which is divided into stages, each stage corresponding to one of a number of gear ratios, the pitch of the screw being constant for each stage, the pitches of successive stages being progressively greater, that stage that corresponds with direct drive having the greatest pitch, and the thread being formed with transition zones corresponding to the speed changes between the successive stages, the screw part of the torque-responsive nut-and-screw member causing the said central shaft to act progressively upon the clutch discs.

7. Automatic change-speed mechanism as claimed in claim 6, the nut portion of the torque-responsive nut-and-screw member being formed with a thread adapted to co-act with the variable-pitch thread of the screw portion, and each thread being formed with a cam surface.

8. Automatic change-speed mechanism as claimed in claim 6, the nut portion of the torque-responsive nut-and-screw member being formed with a thread adapted to co-act with the variable-pitch thread of the screw portion, each thread being formed with a cam surface, and the thread of the said nut portion being of trapezoidal cross section.

9. Automatic change-speed mechanism as claimed in claim 1, further comprising a safety device fitted upon the driven shaft, adapted to cause a lower speed ratio to be brought into operation when the driven shaft is absorbing no power.

10. Automatic change-speed mechanism as claimed in claim 1, further comprising: a safety device fitted upon the driven shaft, the said safety device being adapted to brake the driven shaft and also to cause a lower speed ratio to be brought into operation whenever the driven shaft tends to race.

ROBERT DESCENDRE.

REFERENCES CITED

The following references are of record in the file of this patent:

UNITED STATES PATENTS

| Number | Name | Date |
|---|---|---|
| 784,285 | Sturtevant et al. | Mar. 7, 1905 |
| 809,475 | Sturtevant et al. | Jan. 9, 1906 |
| 2,172,991 | Segard | Sept. 12, 1939 |

FOREIGN PATENTS

| Number | Country | Date |
|---|---|---|
| 47,408 | France (1st add. 808,774) | Jan. 28, 1937 |
| 460,828 | Great Britain | Jan. 29, 1937 |
| 833,524 | France | July 25, 1938 |